United States Patent
Zhang et al.

(10) Patent No.: US 12,066,865 B2
(45) Date of Patent: Aug. 20, 2024

(54) ADJUSTABLE FRAME AND FOLDABLE DISPLAY DEVICE

(71) Applicant: BOE TECHNOLOGY GROUP CO., LTD., Beijing (CN)

(72) Inventors: Chong Zhang, Beijing (CN); Baofeng Sun, Beijing (CN); Yonghong Zhou, Beijing (CN); Yanyan Yang, Beijing (CN); Shangchieh Chu, Beijing (CN); Pengfei Zhou, Beijing (CN); Yanli Wang, Beijing (CN); Wei Liu, Beijing (CN); Bo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 403 days.

(21) Appl. No.: 17/299,333

(22) PCT Filed: Aug. 28, 2020

(86) PCT No.: PCT/CN2020/112091
§ 371 (c)(1),
(2) Date: Jun. 3, 2021

(87) PCT Pub. No.: WO2022/041114
PCT Pub. Date: Mar. 3, 2022

(65) Prior Publication Data
US 2022/0317734 A1    Oct. 6, 2022

(51) Int. Cl.
*G06F 1/16* (2006.01)
(52) U.S. Cl.
CPC .................. *G06F 1/1652* (2013.01)

(58) Field of Classification Search
CPC ................................................... G06F 1/1652
See application file for complete search history.

(56) References Cited

U.S. PATENT DOCUMENTS

| | | | |
|---|---|---|---|
| 9,572,272 B2 * | 2/2017 | Lee | ......................... G09F 9/301 |
| 9,823,697 B2 * | 11/2017 | Hsu | ........................ G06F 1/1624 |

(Continued)

FOREIGN PATENT DOCUMENTS

| | | |
|---|---|---|
| CN | 103019309 | 4/2013 |
| CN | 108322567 | 7/2018 |

(Continued)

OTHER PUBLICATIONS

Written Opinion from PCT/CN2020/112091 dated May 26, 2021.

*Primary Examiner* — Lisa Lea-Edmonds
(74) *Attorney, Agent, or Firm* — Calfee, Halter & Griswold LLP

(57) ABSTRACT

The present disclosure relates to the field of display technology, and proposes an adjustable frame and a foldable display device. The adjustable frame includes a central shaft part, a rotatable frame part, a movable frame part, and an adjustment mechanism. The rotatable frame part is rotatably connected to the central shaft part. The movable frame part is arranged on a side of the rotatable frame part away from the central shaft part. An end of the adjustment mechanism is connected to the central shaft part, and an opposite end of the adjustment mechanism is connected to the movable frame part. The adjusting mechanism is configured to adjust the spacing between the movable frame part and the rotatable frame part with rotation of the rotatable frame part and the movable frame part.

17 Claims, 11 Drawing Sheets

(56) References Cited

U.S. PATENT DOCUMENTS

| | | | |
|---|---|---|---|
| 10,209,741 B2* | 2/2019 | Wang | G06F 1/1652 |
| 10,297,785 B2* | 5/2019 | Ahn | H04M 1/0214 |
| 10,367,164 B2* | 7/2019 | Ahn | G06F 1/16 |
| 10,474,196 B2 | 11/2019 | Yeh | |
| 10,487,550 B2* | 11/2019 | Chu | G06F 1/16 |
| 10,631,402 B2* | 4/2020 | Xiang | G09F 9/301 |
| 10,820,433 B2* | 10/2020 | Cha | H05K 5/0226 |
| 11,003,217 B2* | 5/2021 | Cha | G06F 1/1681 |
| 11,204,627 B2* | 12/2021 | Park | H04M 1/0268 |
| 11,375,628 B2* | 6/2022 | Zhang | G06F 1/1616 |
| 11,538,371 B2* | 12/2022 | Wang | G09F 9/301 |
| 11,540,407 B2* | 12/2022 | Zhang | H05K 5/0226 |
| 11,720,141 B2* | 8/2023 | Kim | G06F 1/3209 345/173 |
| 2014/0092566 A1 | 4/2014 | Shirasaka et al. | |
| 2015/0116921 A1* | 4/2015 | Hsu | G06F 1/1624 361/679.27 |
| 2015/0373863 A1* | 12/2015 | Lin | A45C 13/004 206/774 |
| 2016/0266611 A1* | 9/2016 | Wang | G06F 3/01 |
| 2016/0366772 A1* | 12/2016 | Choi | G06F 1/1675 |
| 2018/0257574 A1 | 9/2018 | Cho et al. | |
| 2018/0267574 A1 | 9/2018 | Cho et al. | |
| 2018/0347245 A1* | 12/2018 | Chu | G06F 1/1681 |
| 2019/0041913 A1 | 2/2019 | Yeh | |
| 2019/0182947 A1* | 6/2019 | Xiang | H05K 1/028 |
| 2021/0044682 A1 | 2/2021 | Liu et al. | |
| 2022/0039273 A1* | 2/2022 | Zhang | H04M 1/0237 |
| 2022/0075414 A1* | 3/2022 | Park | G06F 1/1618 |
| 2022/0322553 A1* | 10/2022 | Zhang | H05K 5/0017 |
| 2023/0095528 A1* | 3/2023 | Park | G06F 1/1624 345/156 |
| 2023/0244278 A1* | 8/2023 | Yan | G06F 1/1637 361/679.01 |

FOREIGN PATENT DOCUMENTS

| | | |
|---|---|---|
| CN | 209330168 | 8/2019 |
| CN | 110493387 | 11/2019 |
| CN | 111262970 | 6/2020 |
| JP | 2014071613 | 4/2014 |
| KR | 20160089164 | 7/2016 |
| WO | 2016117804 | 7/2016 |

* cited by examiner

ADJUSTABLE FRAME AND FOLDABLE DISPLAY DEVICE

RELATED APPLICATION(S)

The present application is a 35 U.S.C. 371 national phase application of PCT International Application No. PCT/CN2020/112091 filed on Aug. 28, 2020, the entire disclosure of which is incorporated herein by reference.

TECHNICAL FIELD

The present disclosure relates to the field of display technology, and in particular to an adjustable frame and a foldable display device including the adjustable frame.

BACKGROUND

With the advancement of science and technology and the development of society, flexible display panels have gradually come into the eyes of consumers. Bendable and rollable display panels have brought consumers a brand-new user experience while facilitating consumers' lives.

However, the frame width of the existing bendable display device cannot be adjusted with the bending of the display panel.

It should be noted that the information disclosed in the background art section above is only used to enhance the understanding of the background of the present disclosure, and therefore may include information that does not constitute the prior art known to those of ordinary skill in the art.

SUMMARY

According to an aspect of the present disclosure, an adjustable frame is provided, including:
 a central shaft part;
 a rotatable frame part, rotatably connected to the central shaft part;
 a movable frame part, provided on a side of the rotatable frame part away from the central shaft part; and
 an adjustment mechanism, an end of which is connected to the central shaft part, and an opposite end of which is connected to the movable frame part, wherein the adjustment mechanism is configured to adjust the spacing between the movable frame part and the movable frame part with rotation of the rotatable frame part and the movable frame part.

In an exemplary embodiment of the present disclosure, the adjustment mechanism includes:
 a fixed shaft, arranged in a cylindrical shape and fixed to the central shaft part, wherein the fixed shaft is arranged coaxially with the rotating shaft of the rotatable frame part;
 a bendable connector, having a first end and a second end opposite to each other, wherein the first end is fixed to the central shaft part, the second end is connected to the movable frame part, and the bendable connector is configured to wind around the cylindrical surface of the fixed shaft with the rotation of the rotatable frame part and the movable frame part when the adjustable frame is folded outward, thereby driving the movable frame part to move toward the rotatable frame part.

In an exemplary embodiment of the present disclosure, an annular groove is provided on the fixed shaft, the annular groove is arranged coaxially with the fixed shaft, and the bendable connector is configured to wind inside the annular groove.

In an exemplary embodiment of the present disclosure, the adjustment mechanism further includes:
 a fixed part, fixed on the central shaft part and located on a side of the fixed shaft away from the rotatable frame part in a deployed state, wherein the first end of the bendable connector is fixed to the fixed part, such that the bendable connector winds around at least a quarter arc on the fixed shaft when the adjustable frame is folded outward.

In an exemplary embodiment of the present disclosure, the adjustment mechanism further includes:
 a limit plate, arranged on a side of the fixed shaft close to a flexible display panel and on a side of the fixed shaft close to the fixed part, wherein the limit plate extends to a position where the bendable connector and the fixed shaft is tangent to each other.

In an exemplary embodiment of the present disclosure, the adjustment mechanism further includes:
 a fixed part, fixed on the central shaft part and located on a side of the fixed shaft away from a flexible display panel, wherein the first end of the bendable connector is fixed to the fixed part, such that the bendable connector winds around at least a quarter arc on the fixed shaft when the adjustable frame is deployed, and such that the bendable connector winds around at least a half arc on the fixed shaft when the adjustable frame is folded outward.

In an exemplary embodiment of the present disclosure, the adjustment mechanism further includes:
 a sliding groove, fixed to the rotatable frame part, wherein the extending direction of the sliding groove is consistent with the moving direction of the movable frame part;
 a slider, arranged in the sliding groove and fixedly connected with the second end of the bendable connector and the movable frame part; and
 an elastic member, provided between the slider and the sliding groove, and configured to drive the slider and the movable frame part to move when the bendable connector is in a loose state.

In an exemplary embodiment of the present disclosure, a baffle is provided at an end of the sliding groove close to the central shaft part, and the elastic member comprises a compression spring connected between the baffle and the slider.

In an exemplary embodiment of the present disclosure, a baffle is provided at an end of the sliding groove away from the central shaft part, and the elastic member comprises an extension spring connected between the baffle and the slider.

In an exemplary embodiment of the present disclosure, the slider is provided with a mounting post, the extending direction of the mounting post is consistent with the moving direction of the movable frame part, and the mounting post is coated with the elastic member.

In an exemplary embodiment of the present disclosure, the movable frame part is configured as a shell in a cuboid-shape, an opening is provided on a side of the shell close to the rotatable frame part, and an end of the rotatable frame part away from the center shaft part is inserted into the shell through the opening.

In an exemplary embodiment of the present disclosure, the adjustment mechanism further includes:
 a positioning post, fixed to an inner side wall of the shell;

a mounting plate, fixed to the positioning post, wherein the second end of the bendable connector is fixed to the mounting plate; and an elongated sliding hole, provided on a side wall of the sliding groove close to the positioning post, wherein the length direction of the sliding hole is consistent with the sliding direction of the slider, and the mounting plate penetrates the sliding hole so as to be fixedly connected with the slider.

In an exemplary embodiment of the present disclosure, the bendable connector comprises a steel wire rope or a nylon rope.

In an exemplary embodiment of the present disclosure, there are two adjustment mechanisms, and the two adjustment mechanisms are respectively provided at opposite ends of the central shaft part.

In an exemplary embodiment of the present disclosure, there are two rotatable frame parts, and the two rotatable frame parts are rotatably connected respectively to opposite sides of the central shaft part; there are two movable frame parts, and each movable frame part is arranged on a side of a respective rotatable frame part away from the central shaft part; and there are four adjustment mechanisms, two of which constitute a group of adjustment mechanisms connected to a respective movable frame part.

According to an aspect of the present disclosure, there is provided a foldable display device, including:

an adjustable frame as described in any one of the above embodiments; and a flexible display panel, arranged on a side of the adjustable frame away from the adjustment mechanism.

Other characteristics and advantages of the present disclosure will become apparent through the following detailed description, or partly learned through the practice of the present disclosure.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and are used together with the specification to explain the principle of the present disclosure. Obviously, the drawings in the following description only represent some embodiments of the present disclosure. For those of ordinary skill in the art, other drawings can be obtained based on these drawings without creative work.

DETAILED DESCRIPTION OF THE EMBODIMENTS

Figure 1:
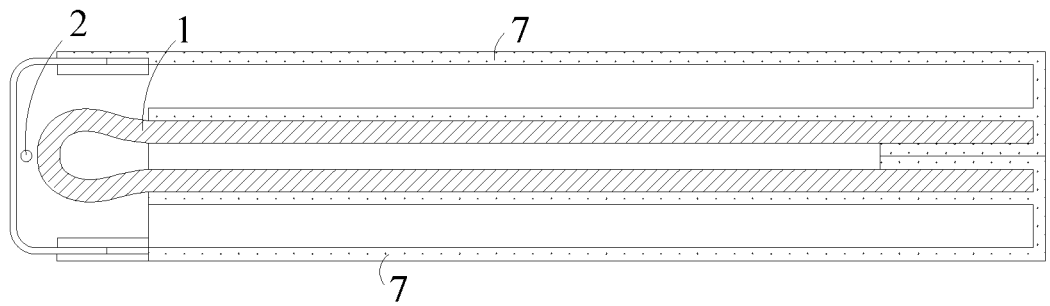
FIG. 1 is a schematic structural diagram of a foldable display device in the related art when it is folded inward.

Example embodiments will now be described more fully with reference to the accompanying drawings. However, the example embodiments can be implemented in various forms, and should not be construed as being limited to the embodiments set forth herein. On the contrary, these embodiments are provided so that the present disclosure will be comprehensive and complete, to fully convey the concept of the example embodiments to those skilled in the art. The same reference numerals in the figures indicate the same or similar structures, and thus their detailed descriptions will be omitted.

The reference signs for the main components in the figures are explained as follows:

1 flexible display panel; 2 central shaft part; 21 support plate; 22 support bar; 23 end panel; 24 first through hole; 25 second through hole; 26 third through hole; 3 rotatable frame part; 31 connecting plate; 32 support plate; 33 rotating shaft; 4 movable frame part; 41 bottom plate; 42 top plate; 43 side plate; 5 adjustment mechanism; 51 steel wire rope; 52 fixed shaft; 53 annular groove; 54 fourth through hole; 55 limit plate; 56 fixed part; 57 fifth through hole; 58 sliding groove; 581 bottom wall; 582 side wall; 583 sliding hole; 584 baffle; 59 slider; 60 elastic member; 61 positioning post; 62 mounting plate; 63 connecting post; 64 mounting post; 65 seventh through hole; 66 sixth through hole; and 7 middle frame part.

Figure 2:
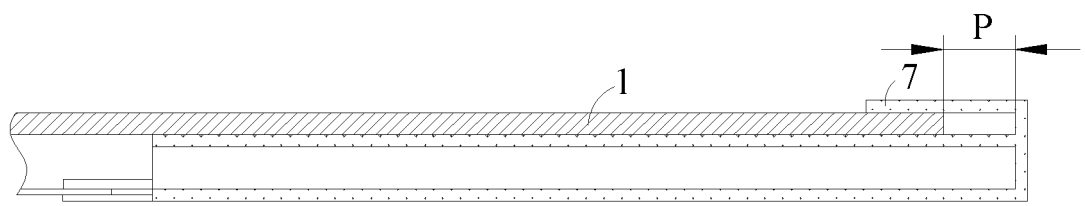
FIG. 2 is a schematic structural diagram of a foldable display device in the related art when it is deployed.
Figure 3:
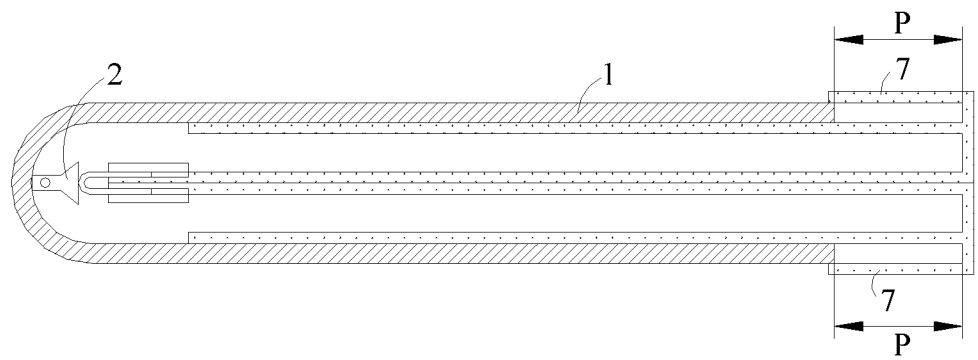
FIG. 3 is a schematic structural diagram of a foldable display device in the related art when it is folded outward.

The 360° foldable display device can adopt three special positioning states: the outwardly folded state, the deployed state, and the inwardly folded state. The outwardly folded state refers to a state where the flexible display panel 1 is outside after being folded 360°, and the internally folded state refers to a state where the flexible display panel 1 is inside after being folded 360°. The foldable display device can include a central shaft part 2, and two middle frame parts 7 connected on opposite sides of the central shaft part 2 respectively, wherein the flexible display panel 1 is arranged on the central shaft part 2 and the two middle frame parts 7, and the two middle frame parts 7 can be rotated relative to the central shaft 2, so as to realize the outwardly folded state, the deployed state, and the inwardly folded state of the foldable display device. When the foldable display device is folded from the inwardly folded state to the outwardly folded state, the flexible display panel 1 will slide a little relative to the middle frame part 7, and the distance P between the flexible display panel 1 and the middle frame part 7 gradually becomes larger, wherein the distance P refers to the distance between the end surface of the flexible display panel 1 and the end surface of the middle frame part 7. As shown in FIG. 1, when the foldable display device is folded inward, the distance P between the flexible display panel 1 and the middle frame part 7 is the smallest. At this time, the distance P is basically zero. That is, the flexible display panel 1 and the middle frame part 7 basically fit together. Thus, the distance P cannot be marked up in the figures. Referring to FIG. 2, when the foldable display device is deployed, the distance P between the flexible display panel 1 and the middle frame part 7 is in an intermediate state. Referring to FIG. 3, when the foldable display device is folded outward, the distance P between the flexible display panel 1 and the middle frame part 7 is the largest. It should be noted that FIG. 1, FIG. 2 and FIG. 3 are mainly used to show the structural relationship between the middle frame part 7 and the flexible display panel 1 in the above three states. Therefore, some structures in the foldable display device are omitted.

An exemplary embodiment first provides an adjustable frame. With reference to the schematic structural diagrams of an adjustable frame and an adjustment mechanism according to an exemplary embodiment of the present disclosure shown in FIGS. 4, 5, 6 and 7. The adjustable frame can include a central shaft part 2, a rotatable frame part 3, a movable frame part 4 and an adjustment mechanism 5. The rotatable frame part 3 is rotatably connected to the central shaft part 2. The movable frame part 4 is arranged on a side of the rotatable frame part 3 away from the central shaft part 2. An end of the adjustment mechanism 5 is connected to the central shaft part 2, and an opposite end of the adjustment mechanism 5 is connected to the movable frame part 4. The adjustment mechanism 5 is configured to adjust the distance PI between the movable frame part 4 and the rotatable frame part 3 with rotate of the rotatable frame part 3 and the movable frame part 4. The distance P1 can be the distance between any fixed point on the movable frame part 4 and any fixed point on the rotatable frame part 3. For example, as shown in the figure, the distance P1 can be the distance between a side of the movable frame part 4 away from the central shaft part 2 and an edge on the connecting plate 31 of the rotatable frame part 3.

In the adjustable frame according to the present disclosure, the rotatable frame part 3 is rotatably connected to the central shaft part 2, the movable frame part 4 is provided on a side of the rotatable frame part 3 away from the central shaft part 2, an end of the adjustment mechanism 5 is connected to the central shaft part 2, and an opposite end of the adjustment mechanism 5 is connected to the movable frame part 4. Besides, the adjustment mechanism 5 is configured for adjusting the distance between the movable frame part 4 and the rotatable frame part 3 with the rotation of the rotatable frame part 3 and the movable frame part 4. The frame is segmented into the rotatable frame part 3 and the movable frame part 4, and the spacing between the movable frame part 4 and the rotatable frame part 3 is adjusted by the adjustment mechanism 5 with the rotation of the rotatable frame part 3 and the movable frame part 4, so as to adjust the width of the frame to meet consumer requirements.

In an exemplary embodiment, the number of rotatable frame parts 3 may be two, and the two rotatable frame parts 3 are rotatably connected respectively to opposite sides of the central shaft part 2. Two movable frame parts 4 can also be provided. The two movable frame parts 4 are respectively arranged on a side of two rotatable frame parts 3 away from the central shaft part 2. That is, a side of a rotatable frame part 3 away from the central shaft part 2 is provided with a respective movable frame part 4. The number of adjustment mechanisms 5 can be set to four, two adjustment mechanisms 5 form a group, and a group of adjustment mechanisms 5 is connected to a respective movable frame part 4. The two adjustment mechanisms 5 in a group can be completely symmetrical. Two adjustment mechanisms 5 are respectively provided at opposite ends of the central shaft part 2. That is, each end of the central shaft part 2 is provided with a respective adjustment mechanism 5. Both ends of the movable frame part 4 can be adjusted simultaneously by the two adjustment mechanisms 5, and thus the movable frame part 4 can be adjusted in a balanced manner. Of course, it is also possible to provide one adjustment mechanism 5, and three, four or more adjustment mechanisms 5 may also be provided. After the adjustable frame is installed with a flexible display panel 1, the parts of the flexible display panel 1 arranged on the two rotatable frame parts 3 can be bent relative to the central shaft part 2.

Of course, in other exemplary embodiments of the present disclosure, only one rotatable frame part 3 and one movable frame part 4 may be provided, and the movable frame part 4 is provided on a side of the rotatable frame part 3 away from the central shaft part 2. That is, the rotatable frame part 3 and the movable frame part 4 are set on a side of the central shaft part 2, and a fixed frame is set on an opposite side of the central shaft part 2. In this case, only two adjustment mechanisms 5 are needed, and the two adjustment mechanisms 5 are respectively provided on opposite ends of the central shaft part 2. That is, an adjustment mechanism 5 is provided at an end of the central shaft part 2. Both ends of the movable frame part 4 can be adjusted simultaneously by the two adjustment mechanisms 5, and thus the movable frame part 4 can be adjusted in a balanced manner. Of course, it is also possible to provide one adjustment mechanism 5, and three, four or more adjustment mechanisms 5 may also be provided. After the adjustable frame is installed with a flexible display panel 1, only the part of the flexible display panel 1 arranged on the rotatable frame part 3 can be bent relative to the central shaft part 2.

Figure 8:
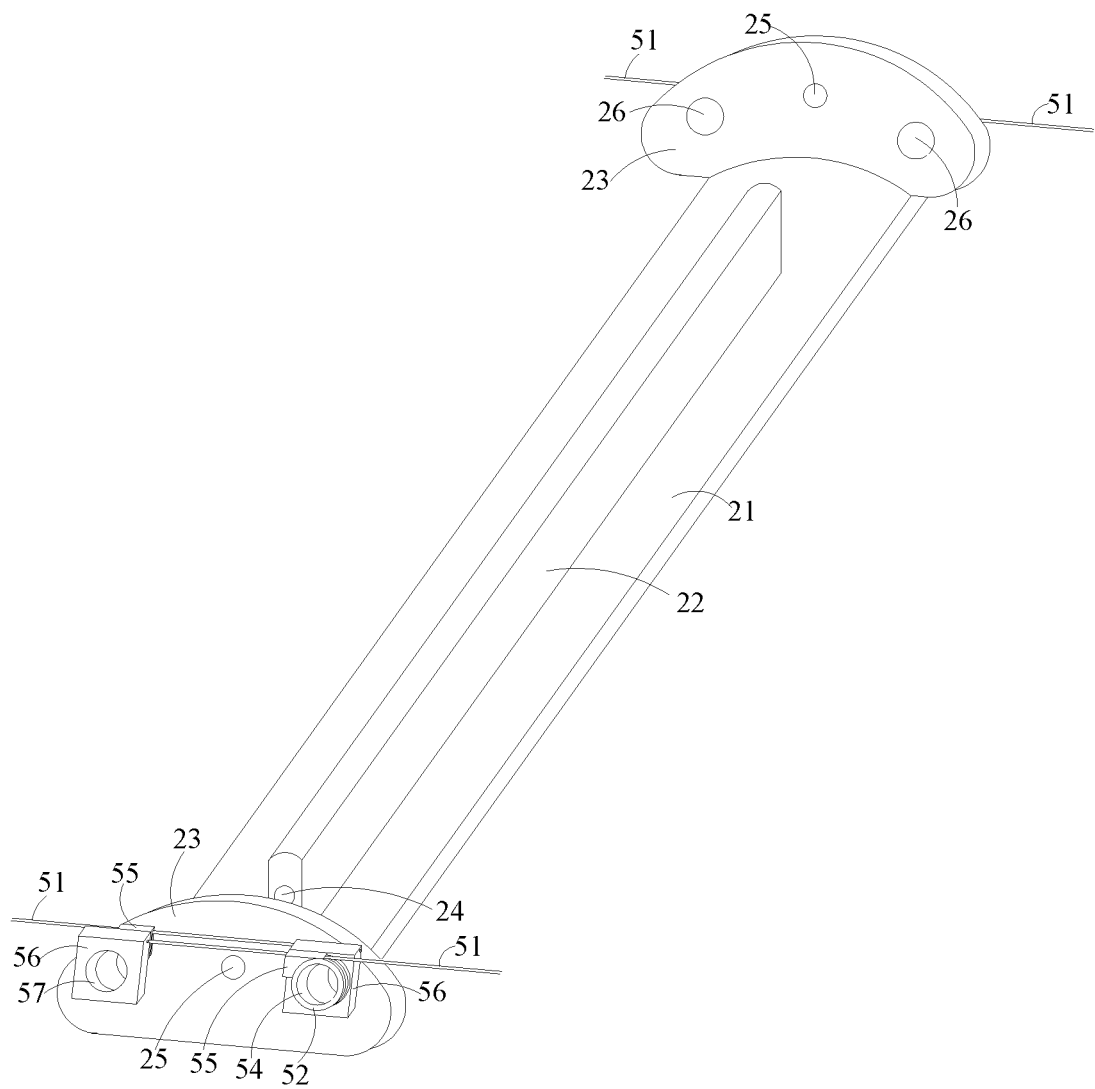
FIG. 8 is a schematic structural diagram of the central shaft part shown in FIG. 4.

In an exemplary embodiment, as shown in FIG. 8, the central shaft part 2 can include a support plate 21, the support plate 21 is arranged in an elongated shape, and two ends of the support plate 21 in the length direction are connected in one-to-one correspondence to two end panels 23. A side surface of the end panel 23 close to the installation position of the flexible display panel 1 is set as a circular arc surface. A support bar 22 is provided on the support plate 21, the support bar 22 is arranged in an elongated shape, and the side of the support bar 22 close to the flexible display panel 1 is set as a circular arc surface, for supporting the flexible display panel 1. The length direction of the support bar 22 is consistent with the length direction of the support plate 21. The support bar 22 is provided with a first through hole 24. The axial direction of the first through hole 24 is consistent with the length direction of the support bar 22. The first through hole 24 can be a craft hole, which is convenient for subsequent installation. A second through hole 25 and two third through holes 26 are provided on the end panel 23. The second through hole 25 and the first through hole 24 are arranged on the same central axis. The two third through holes 26 are symmetrically located on two sides of the second through hole 25, and are respectively located on two sides close to the rotatable frame part 3. The second through hole 25 is also a craft hole, which is convenient for subsequent installation.

Figure 4:
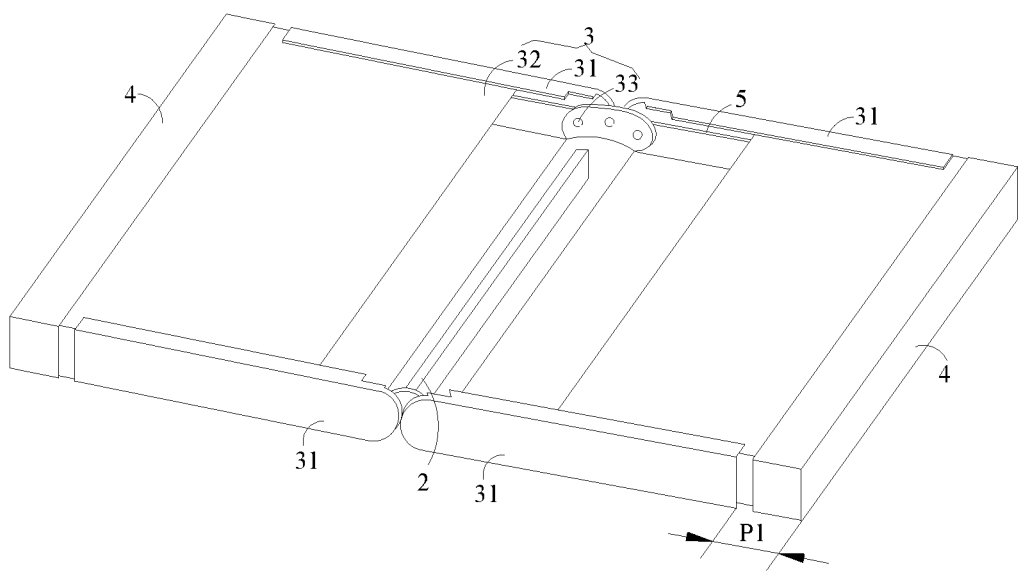
FIG. 4 is a schematic structural diagram of an adjustable frame in a deployed state according to exemplary embodiment of the present disclosure.
Figure 5:
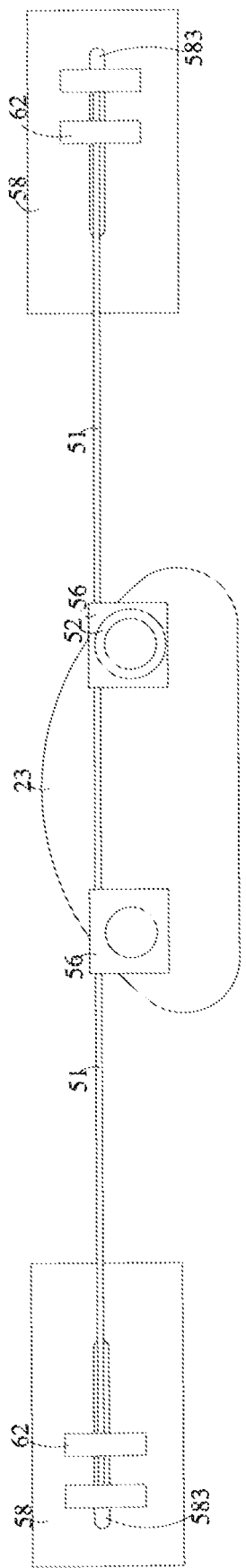
FIG. 5 is a schematic structural diagram of the adjustment mechanism shown in FIG. 4.
Figure 6:
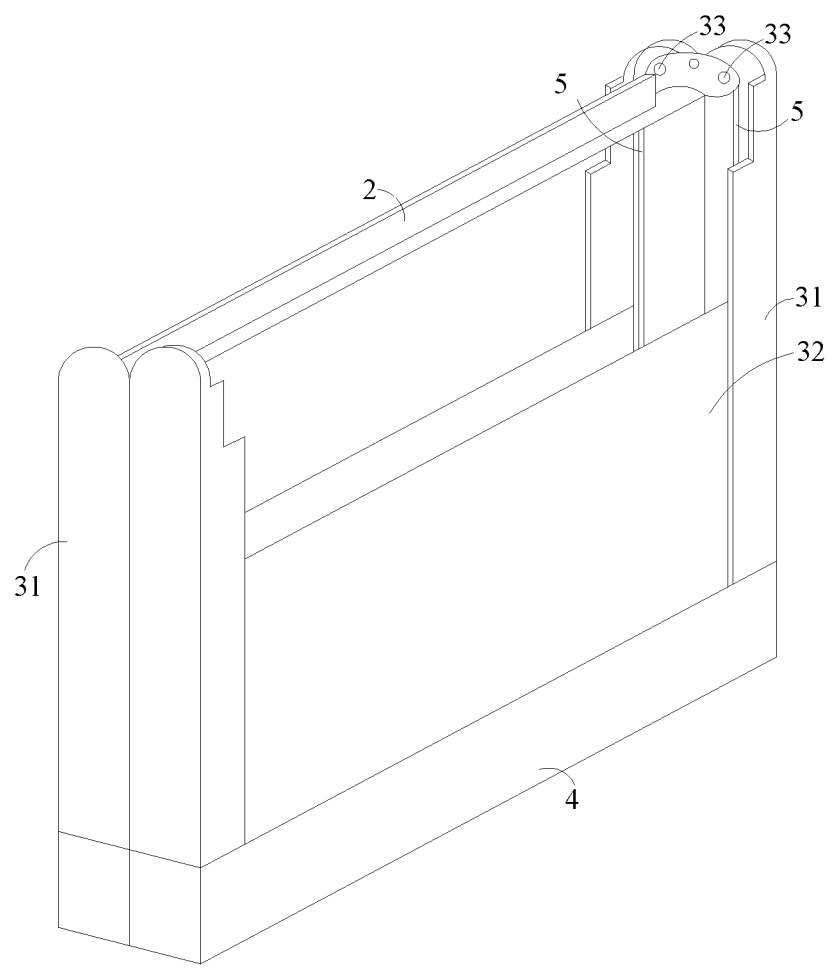
FIG. 6 is a schematic structural diagram of the adjustable frame shown in FIG. 4 when it is folded outward.
Figure 7:
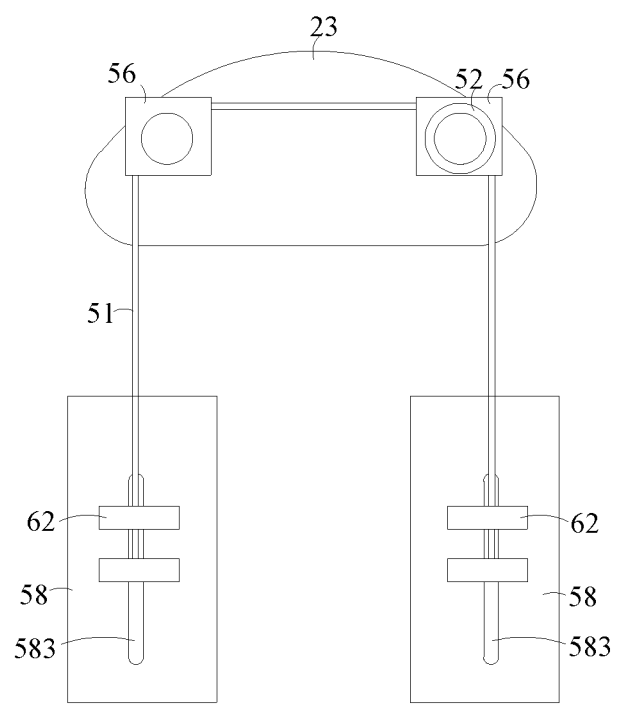
FIG. 7 is a schematic structural diagram of the adjustment mechanism shown in FIG. 6.
Figure 11:
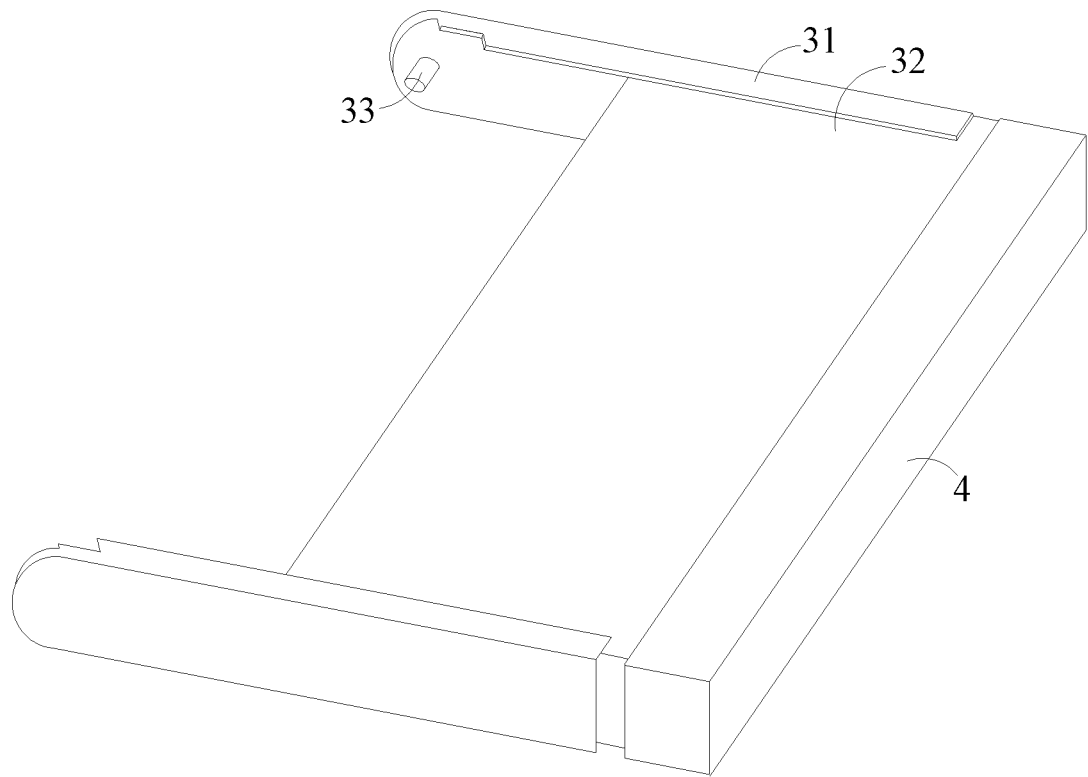
FIG. 11 is a schematic structural diagram of the rotatable frame part and the movable frame part shown in FIG. 4.

With continued reference to FIG. 4, two rotatable frame parts 3 are connected in one-to-one correspondence on two sides of the central shaft part 2, and the two rotatable frame parts 3 can rotate relative to the central shaft part. As shown in FIG. 11, the rotatable frame part 3 can include two connecting plates 31, wherein a support plate 32 is connected between the two connecting plates 31, and a rotating shaft 33 is provided at an end of the connecting plate 31 close to the end panel 23. The rotating shaft 33 can be inserted the third through hole 26 on the end panel 23, thus rendering the rotatable frame part 3 to rotate relative to the central shaft part.

The adjustment mechanism 5 can include a fixed shaft 52 and a bendable connector. In an example embodiment, the bendable connector can be a steel wire rope 51. Of course, in other exemplary embodiments of the present disclosure, the bendable connector may also be a nylon rope, a plastic rope, etc., as long as it is a bendable member without elasticity.

Figure 9:
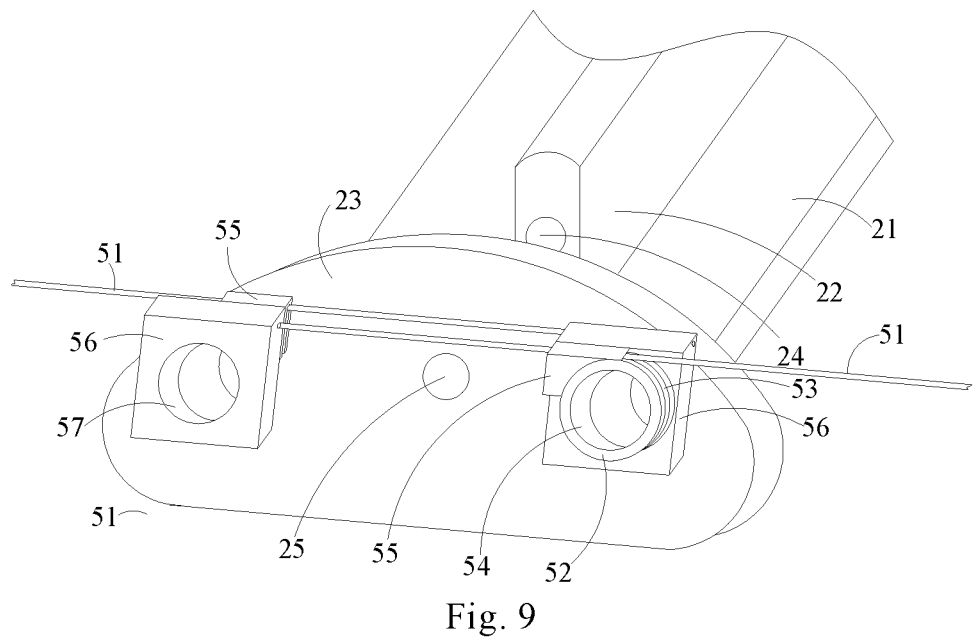
FIG. 9 is a partial enlarged schematic diagram of the end panel part shown in FIG. 8.
Figure 10:
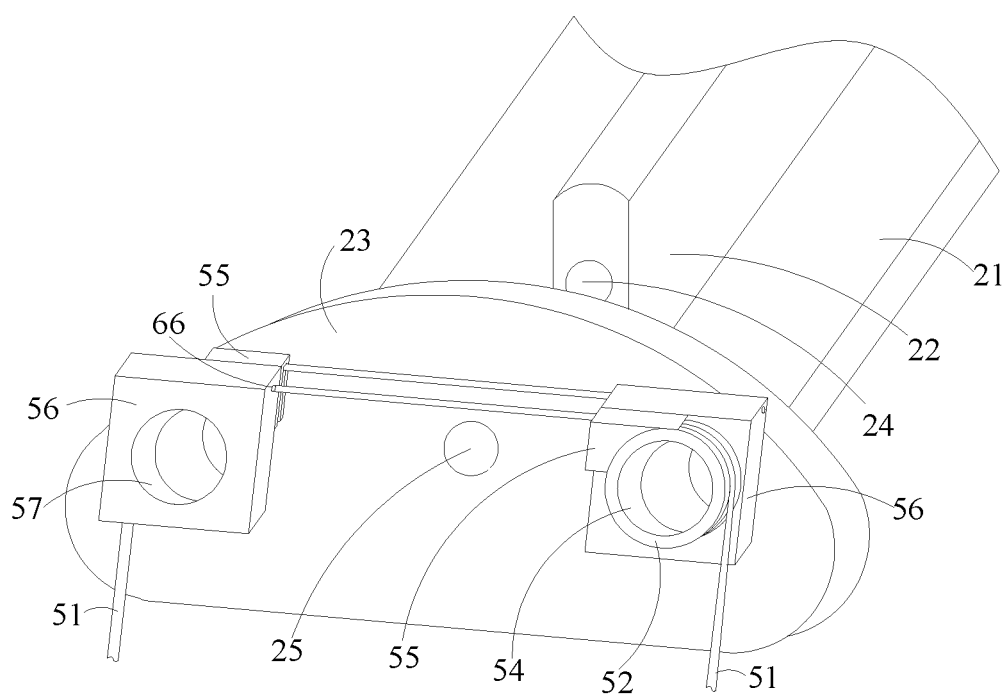
FIG. 10 is a schematic structural diagram of the steel wire rope shown in FIG. 8 after bending.

Referring to FIGS. 8, 9 and 10, two fixed shafts 52 are provided on a side of the end panel 23 away from the support plate 21 (one of the fixed shafts 52 is blocked by the fixed part 56 and thus not shown). The fixed shaft 52 is provided in a cylindrical shape, and the fixed shaft 52 is coaxially arranged with the rotating shaft 33 of the rotatable frame part 3. That is, the axial direction of the fixed shaft 52 is consistent with the axial direction of the third through hole 26. An annular groove 53 is provided on the outer cylindrical surface of the fixed shaft 52, and the annular groove 53 is arranged coaxially with the fixed shaft 52. A fourth through hole 54 is provided on the fixed shaft 52. The fourth through hole 54 has the same diameter as the third through hole 26, and the fourth through hole 54 and the third through hole 26 are arranged on the same central axis. The fixed shaft 52 is coated on the rotating shaft 33 through the fourth through hole 54. That is, the rotating shaft 33 passes through the fourth through hole 54 on the fixed shaft 52 and the third through hole 26 on the end plate 23 in sequence. A limit plate 55 is also provided on the fixed shaft 52. The limit plate 55 is located on a side of the fixed shaft 52 close to the flexible display panel 1. The limit plate 55 is located on a side of the fixed shaft 52 away from the rotatable frame part 3 in a deployed state, i.e., on a side of the fixed shaft 52 close to the other fixed part 56. Besides, the length of the limit plate 55 extends exactly to the position where the steel wire rope 51 and the annular groove 53 are tangent to each other. A groove is provided on the limit plate 55, and the groove communicates with the annular groove 53. When the adjustable frame is folded inward, the limit plate 55 helps to prevent the steel wire rope 51 from falling out of the annular groove 53, and further to prevent the limit plate 55 from blocking the steel wire rope 51 resulting that the steel wire rope 51 is bent and shortened in the inwardly folded state.

The adjustment mechanism 5 can further include a fixed part 56 which is provided in a square plate shape, and a fifth through hole 57 is provided on the fixed part 56, so that the fixed part 56 is formed in a plate shape with a circle inner perimeter and a square outer perimeter. The fifth through hole 57 and the fourth through hole 54 have the same diameter, and the fifth through hole 57 and the fourth through hole 54 are arranged on the same central axis. A sixth through hole 66 is also provided on the fixed part 56. The sixth through hole 66 is located on a side of the fixed part 56 close to the installation position of the flexible display panel 1. The center axis of the sixth through hole 66 and the center axis of the fifth through hole 57 are perpendicular to each other. The first end of the steel wire rope 51 is interference-fitted in the sixth through hole 66, so that the first end of the steel wire rope 51 is fixed to the fixed part 56, the steel wire rope 51 can be tangent to the groove bottom of the annular groove 53, and not wind around the fixed shaft 52 in the deployed state.

In an exemplary embodiment, the two adjustment mechanisms 5 provided at the same end of the central shaft part 2 are slightly different in structure. Two fixed shafts 52 and two fixed parts 56 are provided on one end panel 23. One of the fixed parts 56 is attached to the end panel 23, and the fixed shaft 52 and the limit plate 55 are located on a side of the fixed part 56 away from the end panel 23. A fixed shaft 52 and a limit plate 55 are arranged between the other fixed part 56 and the end panel 23, so that the two steel wire ropes 51 are arranged in a staggered manner. That is, one steel wire rope 51 is closer to the end panel 23 than the other steel wire rope 51.

It should be noted that, in other exemplary embodiments of the present disclosure, the fixed part 56 may not be connected to the fixed shaft 52, but is instead separately provided on the side of the fixed shaft 52 away from the rotatable frame part 3. Moreover, the structure of the fixed part 56 is not limited to the above description. For example, the fixed part 56 can also be configured as a post whose axial direction is consistent with the axial direction of the fixed shaft 52, and an end of the steel wire rope 51 winds fixedly on the post. In the case where the fixed part 56 is separated from the fixed shaft 52, the two steel wire ropes 51 can be arranged without misplacement, even if the two steel wire ropes 51 are arranged opposite to each other. As long as the steel wire rope 51 is tangent to a side of the groove bottom of the annular groove 53 close to the flexible display panel 1 when in the deployed state, the steel wire rope 51 can wind around at least a quarter arc in the annular groove 53 in the outwardly folded state. Of course, the steel wire rope 51 may also partially wind in the annular groove 53 and then tangentially protrude from a side of the annular groove 53 close to the flexible display panel 1 toward the rotatable frame part 3.

When the adjustable frame is folded outward, the steel wire rope 51 is able to wind around the cylindrical surface of the fixed shaft 52 with the rotation of the rotatable frame part 3 and the movable frame part 4, thereby driving the movable frame part 4 to move toward the rotatable frame part 3. Specific descriptions are made with reference to the schematic principle diagrams of FIG. 12 and FIG. 13.

Figure 12:
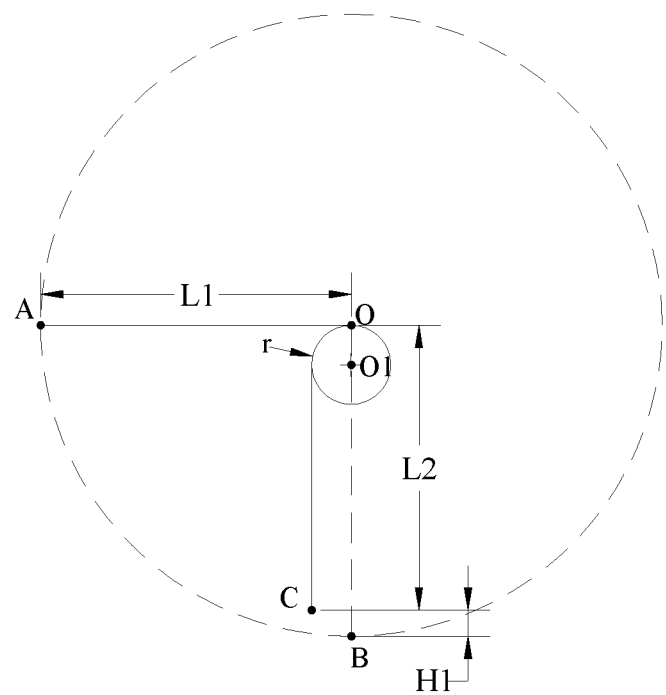
FIG. 12 is a schematic adjustment principle diagram of the adjustment mechanism shown in FIG. 4.

Referring to the principle diagram shown in FIG. 12, the line segment OA in the figure represents the linear length L1 of the steel wire rope 51 in the deployed state, and the dashed line refers to the state of the steel wire rope 51 in the outwardly folded state. At this time, the steel wire rope 51 winds around a quarter arc in the annular groove 53 on the fixed shaft 52. Point B represents the length of the steel wire rope 51 after rotation when it is not wound in the annular groove 53. The distance between point O and point C represents the linear length L2 of the steel wire rope 51 in the outwardly folded state. Since the length of the steel wire rope 51 does not change, the difference H1 between L2 and L1 represents the distance that the steel wire rope 51 drives the moving frame part to move toward the central shaft part 2 in the outwardly folded state, H1=πr/2−r, where r is the bottom radius of the annular groove 53.

The above structure can help to adjust the movable frame part 4 from the deployed state to the outwardly folded state, thus driving the movable frame part 4 to move toward the rotatable frame part 3. In this process of state change, the width of the adjustable frame is reduced.

In some other exemplary embodiments of the present disclosure, the fixed part 56 may be located on a side of the fixed shaft 52 away from the display panel, and the first end of the bendable connector is fixed to the fixed part 56, so that when the adjustable frame is folded outward, the steel wire rope 51 wind around at least a half arc on the fixed shaft 52, and so that when the adjustable frame is deployed, the steel wire rope 51 winds around at least a quarter arc on the fixed shaft 52. The structure of the fixed part 56 can be the same as the structure shown in FIGS. 7 and 8, except that the sixth through hole 66 is provided on a side of the fixed part 56 away from the rotatable frame part 3 in the deployed state, and the central axis of the sixth through hole 66 is perpendicular to the central axis of the fifth through hole 57. As long as the steel wire rope 51 is tangent to the side of the groove bottom of the annular groove 53 close to the other fixed post in the inwardly folded state, the steel wire rope 51 can wind around at least a quarter arc in the annular groove 53 in the deployed state, and the steel wire rope 51 winds around at least a half arc in the annular groove 53 in the outwardly folded state. Of course, it is also possible that the steel wire rope 51 is partially wound in the annular groove 53 and then tangentially extends from a side of the annular groove 53 close to the other fixed post toward the flexible display panel 1.

Figure 13:
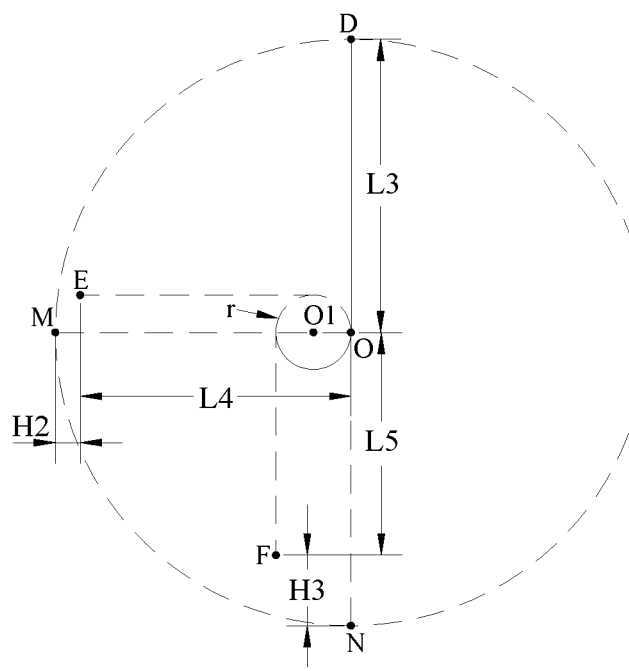
FIG. 13 is a schematic adjustment principle diagram of an adjustable frame according to another exemplary embodiment of the present disclosure.

Referring to the principle diagram according to another exemplary embodiment shown in FIG. 13, the line segment OD in the figure represents the linear length L3 of the steel wire rope 51 in the inwardly folded state. Point M and Point N indicate the length of the steel wire rope 51 when it winds in the annular groove 53 on the fixed shaft 52 after rotation. The distance between Point O and Point E indicates the linear length L4 of the steel wire rope 51 in the deployed state. At this time, the steel wire rope 51 winds around a quarter arc in the annular groove 53 on the fixed shaft 52. Since the length of the steel wire rope 51 does not change, the difference H2 between L4 and L3 indicates the distance that the steel wire rope 51 drives movable frame part to move toward the central shaft part 2 in the deployed state, H2=πr/2−r, where r is the groove bottom radius of the annular groove 53. The distance between point O and point F represents the linear length L5 of the steel wire rope 51 in the outwardly folded state. At this time, the steel wire rope 51 winds around a half arc in the annular groove 53 on the fixed shaft 52. As the length of the steel wire rope 51 will not change, the difference H3 between L5 and L3 represents the distance that the steel wire rope 51 drives the movable frame part to move toward the central shaft part 2 in the outwardly folded state, H3=L3−πr, where r is the groove bottom radius of the annular groove 53.

The above structure helps to adjust the movable frame part 4 from the inwardly folded state to the deployed state, and then from the deployed state to the outwardly folded state, wherein the movable frame part 4 is driven to move toward the rotatable frame part 3, and the process of state change helps to reduce the width of the adjustable frame. However, when the adjustable frame changes from the outwardly folded state to the deployed state, and from the deployed state to the inwardly folded state, in order to have enough space to accommodate the flexible display panel 1, the movable frame part 4 needs to be manually pulled, so as to increase the distance between the movable frame part 4 and the rotatable frame part 3, thus increasing the width of the entire adjustable frame. The adjustment mechanism 5 will be further described below. The adjustment mechanism 5 can automatically adjust the width of the entire adjustable frame.

Figure 14:
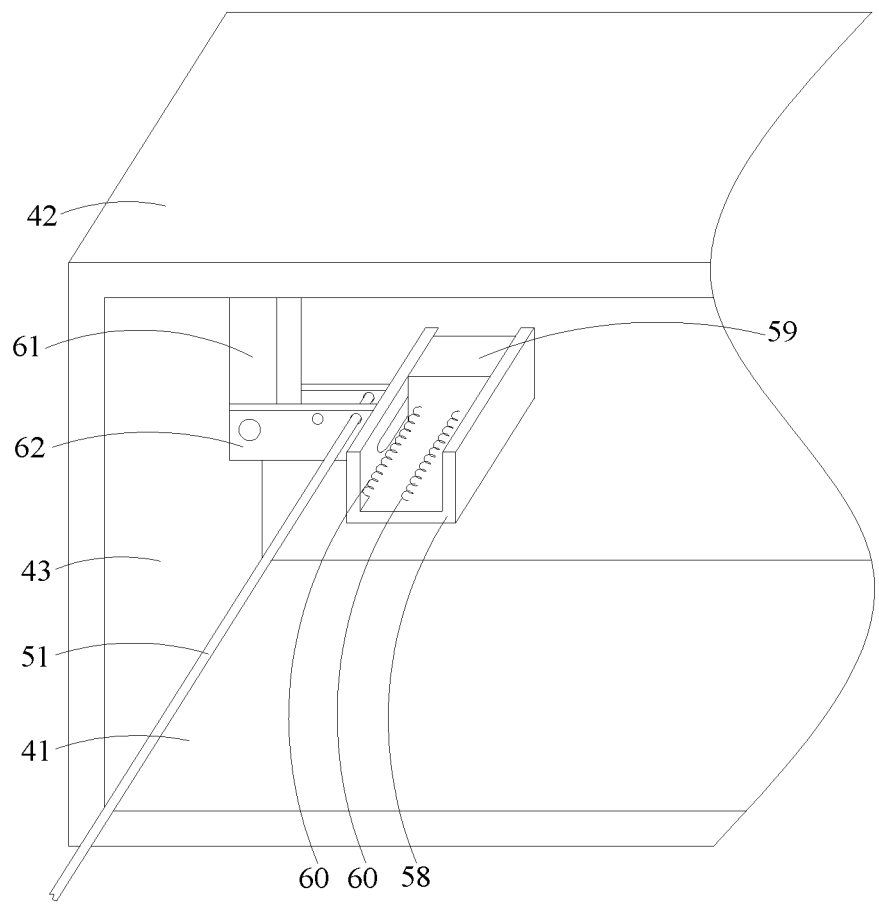
FIG. 14 is a schematic structural diagram of the movable frame part and a part of the adjustment mechanism in the movable frame part shown in FIG. 5.

In an exemplary embodiment, as shown in FIG. 14, the movable frame part 4 is set as a cuboid-shaped shell, an side of the shell is provided with an opening, and an end of the rotatable frame part 3 away from the central shaft part 2 is inserted into the shell through the opening. The rotatable frame part 3 can guide the movement of the movable frame part 4. Specifically, the movable frame part 4 can include a bottom plate 41, a top plate 42, and three side plates 43 connected between the bottom plate 41 and the top plate 42. The bottom plate 41 and the top plate 42 are arranged oppositely, and the bottom plate 41 and the top plate 42 are both rectangular in shape. The three side plates 43 help to provide the movable frame part with an opening.

Figure 15:
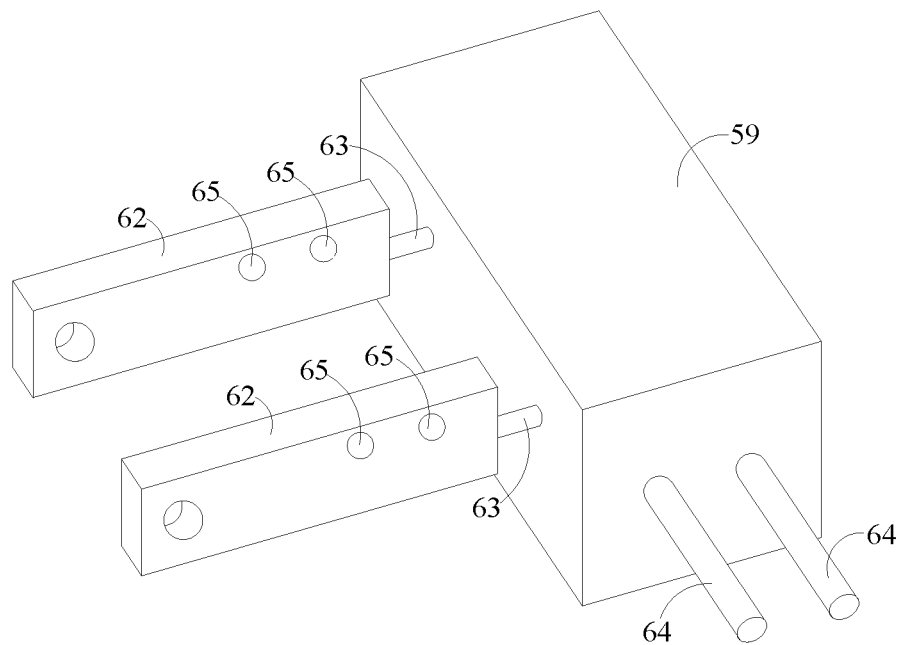
FIG. 15 is a schematic structural diagram of the slider and the mounting plate shown in FIG. 14 after being connected.

With continued reference to FIG. 15, the adjustment mechanism 5 can also include a sliding groove 58, a slider 59 and an elastic member 60. The sliding groove 58 is fixed to the rotatable frame part 3, and the extending direction of the sliding groove 58 is consistent with the moving direction of the movable frame part 4. The slider 59 is arranged in the sliding groove 58, and is fixedly connected to the second end of the bendable connector and the movable frame part 4. The elastic member 60 is arranged between the slider 59 and the sliding groove 58, so as to drive the slider 59 and the movable frame part 4 to move when the bendable connector is in a loose state.

Specifically, the inner wall of the side plate 43 of the shell of the movable frame part 4 is provided with a positioning post 61, the positioning post 61 is arranged as a rectangular prism, and screws are used on opposite side walls 582 of the positioning post 61 away from and close to the rotatable frame part 3 to fix two mounting plates 62, wherein the two mounting plates 62 extend toward the inner side of the movable frame part 4. Referring to FIG. 15, two seventh through holes 65 are provided on the mounting plate 62, and the second end of the steel wire rope 51 sequentially penetrates the seventh through holes 65 on the two mounting plates 62, wherein by providing two seventh through holes 65, it can be determined to fix the steel wire rope 51 in which of the two seventh through holes 65 according to needs. Then the second end of the steel wire rope 51 can be fixedly connected to the mounting plate 62 by welding, and the second end of the steel wire rope 51 can be fixed to the movable frame part 4. Of course, it can also be fixedly connected by means of screws, rivets, etc. A connecting post 63 is provided at an end of the mounting plate 62 away from the positioning post 61, and the extending direction of the connecting post 63 is consistent with the extending direction of the mounting plate 62.

The above-mentioned connecting post 63 is connected to the slider 59. Two blind holes are provided on a side of the slider 59 close to the two mounting plates 62. The two connecting posts 63 are interference-fitted in the blind holes to fix the connecting post 63 and the slider. That is, the second end of the steel wire rope 51 is fixed to the slider 59. Thus, the steel wire rope 51, the mounting plate 62, the slider 59, the positioning post 61 and the movable frame part 4 are fixed as a whole.

Figure 16:
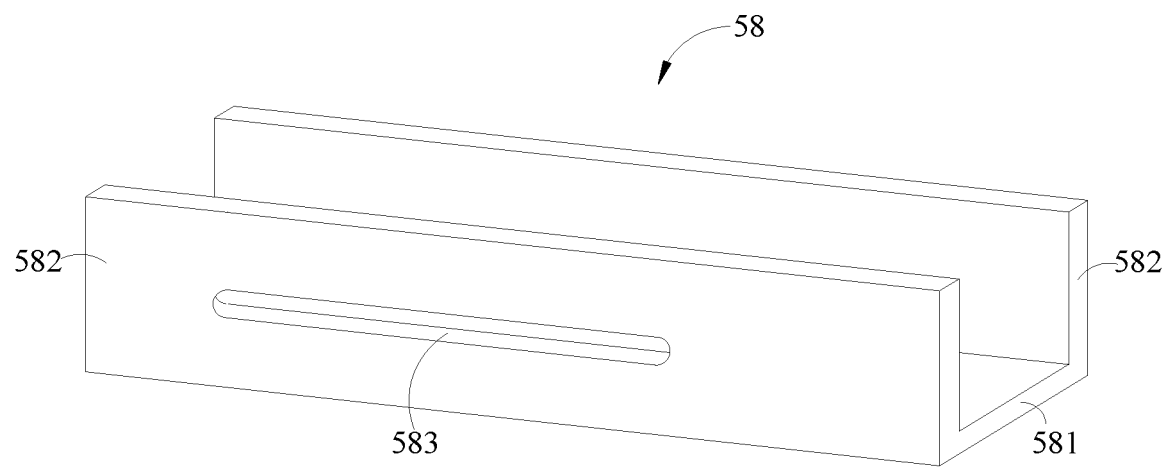
FIG. 16 is a schematic structural diagram of the sliding groove shown in FIG. 14.

The sliding groove 58 is provided on a side of the rotatable frame part 3 away from the flexible display panel 1. As shown in FIG. 16, the sliding groove 58 can include a bottom wall 581 and two side walls 582, the bottom wall 581 is arranged parallel to the supporting plate 32 of the rotatable frame part 3, and the two side walls 582 are connected to the supporting plate 32 of the rotatable frame part 3. An elongated sliding hole 583 is provided on the side wall 582 of the sliding groove 58 close to the positioning post 61. The length direction of the sliding hole 583 is consistent with the sliding direction of the slider 59, and the connecting post 63 on the mounting plate 62 penetrates the sliding hole 583 so as to be fixedly connected to the slider 59. Thus, the sliding distance of the slider 59 can be limited by the sliding hole 583, so as to prevent the slider 59 from falling out of the sliding groove 58.

In addition, in some other exemplary embodiments of the present disclosure, the slider 59 can be directly fixed to the inner wall of the top plate 42 of the movable frame part 4, and the second end of the steel wire rope 51 is also directly fixed to a side of the slider 59 close to the rotatable frame part. Both ends of the sliding groove 58 can be provided with baffles, and the two baffles can limit the sliding distance of the slider 59, so as to prevent the slider 59 from falling out of the sliding groove 58.

Figure 17:
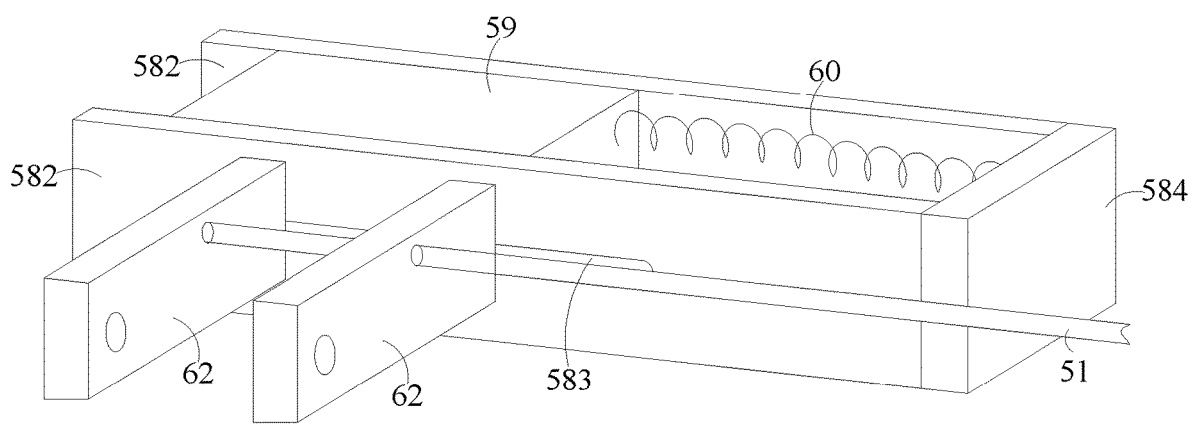
FIG. 17 is a schematic structural view of an elastic member, a mounting plate and a sliding groove in a deployed state.
Figure 18:
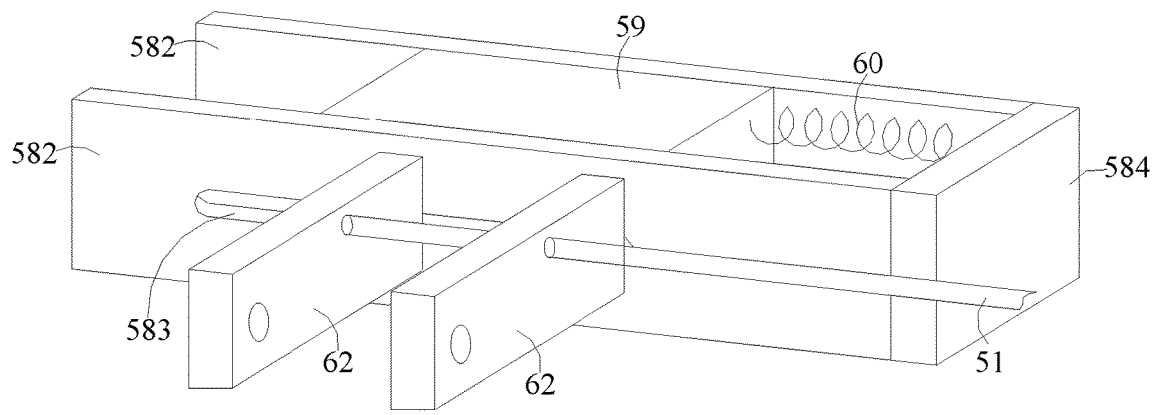
FIG. 18 is a schematic structural diagram of an elastic member, a mounting plate and a sliding groove in an outwardly folded state.

Referring to FIG. 17, a baffle 584 is provided at an end of the sliding groove 58 close to the central shaft part 2. The elastic member 60 can be a compression spring, and the compression spring is connected between the baffle 584 and the slider 59. When the adjustable frame is adjusted from the deployed state to the outwardly folded state, the linear distance of the steel wire rope 51 gradually decreases, because the length of the steel wire rope 51 wound on the fixed post gradually increases. Referring to FIG. 18, the steel wire rope 51 drives the slider 59 and the movable frame part 4, etc. to move toward the rotatable frame part 3. During this process, the compression spring is compressed to generate an elastic force that stretches out. When the adjustable frame is adjusted from the outwardly folded state to the deployed state, the linear distance of the steel wire rope 51 gradually increases, and the steel wire rope 51 gradually relaxes, because the length of the steel wire rope 51 wound on the fixed post is gradually shortened. At this time, the elastic force, which is stretching out, of the compression spring is greater than the pulling force of the steel wire rope 51. The slider 59 and the movable frame part 4 and so on are pushed to a side away from the rotatable frame part 3.

In addition, it can be understood that the baffle 584 can be disposed at an end of the sliding groove 58 away from the central shaft part 2, and the elastic member 60 can be an extension spring connected between the baffle 584 and the slider 59. When the adjustable frame is adjusted from the deployed state to the outwardly folded state, the linear distance of the steel wire rope 51 gradually decreases, because the length of the steel wire rope 51 wound on the fixed post gradually increases, thus driving the slider 59 and the movable frame part 4 and so on to move toward the rotatable frame part 3. During this process, the extension spring is stretched to produce an inward contraction elastic force. When the adjustable frame is adjusted from the outwardly folded state to the deployed state, the linear distance of the steel wire rope 51 gradually increases, and the steel wire rope 51 gradually relaxes, because the length of the steel wire rope 51 wound on the fixed post is gradually shortened. At this time, the inward contraction elastic force of the extension spring is greater than the pulling force of the steel wire rope 51, thus pulling the slider 59 and the movable frame part 4 and so on toward a side away from the rotatable frame part 3.

With continued reference to FIG. 15, in an exemplary embodiment, a mounting post 64 is provided on the slider 59, and the extending direction of the mounting post 64 is consistent with the moving direction of the movable frame part 4. Of course, the extending direction of the mounting post 64 is also the same as the extending direction of the sliding groove 58. The mounting post 64 is located on a side of the slider 59 close to the rotatable frame part 3, and the mounting post 64 is coated with a compression spring. Of course, when the elastic member 60 is an extension spring, the mounting post 64 is located on a side of the slider 59 away from the rotatable frame part 3, and the mounting post 64 is coated with the extension spring.

Further, an example embodiment also provides a foldable display device, which can include a flexible display panel 1 and an adjustable frame as described in any one of the above embodiment, wherein the flexible display panel 1 is provided on a side of the adjustable frame away from the adjustment mechanism 5. The non-display surface of the flexible display panel 1 is adhered to the rotatable frame part. The specific structure of the adjustable frame has been described in detail above, so it will not be repeated here.

The specific type of the foldable display device is not particularly limited. The types of display devices commonly used in relevant field can be used, such as mobile devices such as mobile phones, wearable devices such as watches, VR devices, etc. The specific purpose of the display device can be relied on to make selections accordingly, which will not be repeated here.

It should be noted that, in addition to the flexible display panel 1, the foldable display device also includes other necessary parts and components. Taking a mobile phone as an example, specific components include housing, circuit board, power cord, etc. . . . Those skilled in the art can make supplements accordingly based on the specific usage requirements of the foldable display device, which will not be repeated here.

Compared with the prior art, the beneficial effects of the foldable display device provided by embodiments of the present disclosure are the same as the beneficial effects of the adjustable frame provided by the above-mentioned embodiments, and will not be repeated here.

The features, structures, or characteristics described above can be combined in one or more embodiments in any suitable manner. If possible, the features discussed in the embodiments are interchangeable. In the above description, many specific details are provided to give a sufficient understanding of embodiments of the present disclosure. However, those skilled in the art will realize that the technical solutions of the present disclosure can be practiced without one or more of the specific details, and other methods, components, materials, etc. can be used. In other cases, well-known structures, materials, or operations are not shown or described in detail to avoid obscuring aspects of the present disclosure.

Although relative terms such as "upper" and "lower" are used in the present specification to describe the relative relationship between one component and another component, these terms are used in the present specification only for convenience, for example, used based on the example direction shown in the drawings. It can be understood that if a device is turned over and turned upside down, the component described as an "upper" component will become a "lower" component. Other relative terms, such as "high", "low", "top", and "bottom" have similar meanings. When a first structure is "on" a second structure, it may mean that the first structure is integrally formed on the second structure, or that the first structure is "directly" arranged on the second structure, or that the first structure is "indirectly" arranged on the second structure through a third structure.

In the present specification, the terms "a", "an", "the" and "said" are used to indicate the presence of one or more elements, components, etc. . . . The terms "including", "comprising" and "having" are used to indicate the open-ended inclusion, meaning that in addition to the listed elements, components, etc., there may be other elements, components, etc. . . . The terms "first", "second" and "third", etc. are only used as markers, not as a restriction on the number of objects.

It should be understood that the present disclosure does not limit the instant application to the detailed structure and arrangement of the components proposed in the present specification. The present disclosure can have other embodiments, and can be implemented and executed in various ways. The aforementioned deformations and modifications fall within the scope of the present disclosure. It should be understood that the present disclosure disclosed and defined in the present specification extends to all alternative combinations of two or more individual features mentioned or obvious in the text and/or drawings. All these different combinations constitute multiple alternative aspects of the present disclosure. The embodiments described in the present specification illustrate the best mode known for implementing the present disclosure, and will enable those skilled in the art to utilize the present disclosure.

The invention claimed is:

1. An adjustable frame, comprising:
a central shaft part;
a rotatable frame part, rotatably connected to the central shaft part;
a movable frame part, provided on a side of the rotatable frame part away from the central shaft part; and
an adjustment mechanism, wherein an end of the adjustment mechanism is connected to the central shaft part, and an opposite end of the adjustment mechanism is connected to the movable frame part, wherein
the adjustment mechanism is configured to adjust a spacing between the movable frame part and the rotatable frame part with rotation of the rotatable frame part and the movable frame part,
wherein the adjustment mechanism comprises:
a fixed shaft, having a cylindrical shape and fixed to the central shaft part, wherein the fixed shaft is arranged coaxially with a rotating shaft of the rotatable frame part; and
a bendable connector, having a first end and a second end opposite to each other, wherein the first end is fixed to the central shaft part, the second end is connected to the movable frame part, and the bendable connector is configured to wind around a cylindrical surface of the fixed shaft with the rotation of the rotatable frame part and the movable frame part when the adjustable frame is folded outward, thereby driving the movable frame part to move toward the rotatable frame part.

2. The adjustable frame according to claim 1, wherein an annular groove is provided on the fixed shaft, the annular groove is arranged coaxially with the fixed shaft and the bendable connector is configured to wind inside the annular groove.

3. The adjustable frame according to claim 1, wherein the adjustment mechanism further comprises:
a fixed part, fixed on the central shaft part and located on a side of the fixed shaft away from the rotatable frame part in a deployed state, wherein the first end of the bendable connector is fixed to the fixed part, such that the bendable connector winds around at least a quarter arc on the fixed shaft when the adjustable frame is folded outward.

4. The adjustable frame according to claim 3, wherein the adjustment mechanism further comprises:
a limit plate, arranged on a side of the fixed shaft close to a flexible display panel and on a side of the fixed shaft close to the fixed part, wherein the limit plate extends to a position where the bendable connector and the fixed shaft is tangent to each other.

5. The adjustable frame according to claim 1, wherein the adjustment mechanism further comprises:
a fixed part, fixed on the central shaft part and located on a side of the fixed shaft away from a flexible display panel, wherein the first end of the bendable connector is fixed to the fixed part, such that the bendable connector winds around at least a quarter arc on the fixed shaft when the adjustable frame is deployed, and such that the bendable connector winds around at least a half arc on the fixed shaft when the adjustable frame is folded outward.

6. The adjustable frame according to claim 1, wherein the adjustment mechanism further comprises:
a sliding groove, fixed to the rotatable frame part, wherein an extending direction of the sliding groove is consistent with a moving direction of the movable frame part;
a slider, arranged in the sliding groove and fixedly connected with the second end of the bendable connector and the movable frame part; and
an elastic member, provided between the slider and the sliding groove, and configured to drive the slider and the movable frame part to move when the bendable connector is in a loose state.

7. The adjustable frame according to claim 6, wherein a baffle is provided at an end of the sliding groove close to the central shaft part, and the elastic member comprises a compression spring connected between the baffle and the slider.

8. The adjustable frame according to claim 6, wherein a baffle is provided at an end of the sliding groove away from the central shaft part, and the elastic member comprises an extension spring connected between the baffle and the slider.

9. The adjustable frame according to claim 6, wherein the slider is provided with a mounting post, an extending direction of the mounting post is consistent with a moving direction of the movable frame part, and the mounting post is coated with the elastic member.

10. The adjustable frame according to claim 6, wherein the movable frame part is configured as a shell in a cuboid shape, an opening is provided on a side of the shell close to the rotatable frame part, and an end of the rotatable frame part away from the central shaft part is inserted into the shell through the opening.

11. The adjustable frame according to claim 10, wherein the adjustment mechanism further comprises:
a positioning post, fixed to an inner side wall of the shell;
a mounting plate, fixed to the positioning post, wherein the second end of the bendable connector is fixed to the mounting plate; and
an elongated sliding hole, provided on a side wall of the sliding groove close to the positioning post, wherein a length direction of the sliding hole is consistent with a sliding direction of the slider, and the mounting plate penetrates the sliding hole so as to be fixedly connected with the slider.

12. The adjustable frame according to claim 1, wherein the bendable connector comprises a steel wire rope or a nylon rope.

13. The adjustable frame according to claim 1, wherein there are two adjustment mechanisms, and the two adjustment mechanisms are respectively arranged at opposite ends of the central shaft part.

14. An adjustable frame, comprising:
a central shaft part;
a rotatable frame part, rotatably connected to the central shaft part;
a movable frame part, provided on a side of the rotatable frame part away from the central shaft part; and
an adjustment mechanism, wherein an end of the adjustment mechanism is connected to the central shaft part, and an opposite end of the adjustment mechanism is connected to the movable frame part, wherein
the adjustment mechanism is configured to adjust a spacing between the movable frame part and the rotatable frame part with rotation of the rotatable frame part and the movable frame part,
wherein
there are two rotatable frame parts, and the two rotatable frame parts are rotatably connected respectively to opposite sides of the central shaft part;
there are two movable frame parts, wherein each movable frame part is arranged on a side of a respective rotatable frame part away from the central shaft part; and
there are four adjustment mechanisms, two of the four adjustment mechanisms constitute a group of adjustment mechanisms connected to a respective movable frame part.

15. A foldable display device, comprising:
an adjustable frame, comprising:
a central shaft part;
a rotatable frame part, rotatably connected to the central shaft part;
a movable frame part, provided on a side of the rotatable frame part away from the central shaft part; and
an adjustment mechanism, wherein an end of the adjustment mechanism is connected to the central shaft part, and an opposite end of the adjustment mechanism is connected to the movable frame part, wherein the adjustment mechanism is configured to adjust a spacing between the movable frame part and the rotatable frame part with rotation of the rotatable frame part and the movable frame part; and
a flexible display panel, arranged on a side of the adjustable frame away from the adjustment mechanism,
wherein the adjustment mechanism comprises:
a fixed shaft, having a cylindrical shape and fixed to the central shaft part, wherein the fixed shaft is arranged coaxially with a rotating shaft of the rotatable frame part; and
a bendable connector, having a first end and a second end opposite to each other, wherein the first end is fixed to the central shaft part, the second end is connected to the movable frame part, and the bendable connector is configured to wind around a cylindrical surface of the fixed shaft with the rotation of the rotatable frame part and the movable frame part when the adjustable frame is folded outward, thereby driving the movable frame part to move toward the rotatable frame part.

16. The foldable display device according to claim 15, wherein an annular groove is provided on the fixed shaft, the annular groove is arranged coaxially with the fixed shaft and the bendable connector is configured to wind inside the annular groove.

17. The foldable display device according to claim 15, wherein there are two adjustment mechanisms, and the two adjustment mechanisms are respectively arranged at opposite ends of the central shaft part.

\* \* \* \* \*